United States Patent [19]
Kato et al.

[11] Patent Number: 6,009,773
[45] Date of Patent: Jan. 4, 2000

[54] MOTION CONVERSION APPARATUS

[75] Inventors: Heizaburo Kato, Shizuoka-ken; Masao Nishioka, Fukuroi; Motoo Takamura, Shizuoka-ken, all of Japan

[73] Assignee: Sankyo Seisakusho Co., Tokyo, Japan

[21] Appl. No.: 08/822,880

[22] Filed: Mar. 24, 1997

[30] Foreign Application Priority Data

Apr. 1, 1996 [JP] Japan .................................. 8-078741

[51] Int. Cl.[7] .................................................. F16H 53/06
[52] U.S. Cl. ............................................. 74/569; 74/84 R
[58] Field of Search ............................ 74/569, 55, 84 R

[56] References Cited

U.S. PATENT DOCUMENTS

| | | | |
|---|---|---|---|
| 2,857,157 | 10/1958 | Bonquet | 74/56 X |
| 3,864,981 | 2/1975 | Schlegel | 74/569 X |
| 4,248,104 | 2/1981 | Wood, III | 74/569 |
| 4,726,253 | 2/1988 | Russell | 74/569 |
| 4,854,236 | 8/1989 | Thunker et al. | 74/569 X |
| 4,955,243 | 9/1990 | Kato et al. | 74/569 X |
| 5,544,537 | 8/1996 | Konzal | 74/569 X |
| 5,544,576 | 8/1996 | Kato | 100/35 |

FOREIGN PATENT DOCUMENTS

| | | |
|---|---|---|
| 0010695 | 5/1980 | European Pat. Off. . |
| 4437957A1 | 4/1995 | Germany . |
| 4437958A1 | 4/1995 | Germany . |
| 54-159 | 1/1979 | Japan . |
| 1-120472 | 12/1989 | Japan . |

*Primary Examiner*—Charles A. Marmor
*Assistant Examiner*—Scott Lund
*Attorney, Agent, or Firm*—Harness, Dickey & Pierce P.L.C.

[57] ABSTRACT

A motion conversion apparatus having a torque compensation device which is operable to cancel a fluctuation torque, acting on an input shaft due to an inertia load and a fluctuation torque acting on the input shaft due to a frictional load. The motion conversion apparatus converts a continuous rotational motion of the input shaft into a predetermined-type motion of an output shaft through a transmission cam device with the torque compensation device comprising a cam connected to the input shaft, a cam follower, and a resilient force-producing device pressing the cam follower against the cam. The torque compensation device is operable to cancel (a) a frictional fluctuation torque portion which is obtained by subtracting from a fluctuation torque acting on at least one of the input shaft and the output shaft when converting the motion of the input shaft into the motion of the output shaft through the transmission cam device, an average value or the approximate average value of the fluctuation torque, and (b) a fluctuation torque acting on the input shaft due to an inertia load when converting the motion of the input shaft into the motion of the output shaft.

10 Claims, 16 Drawing Sheets

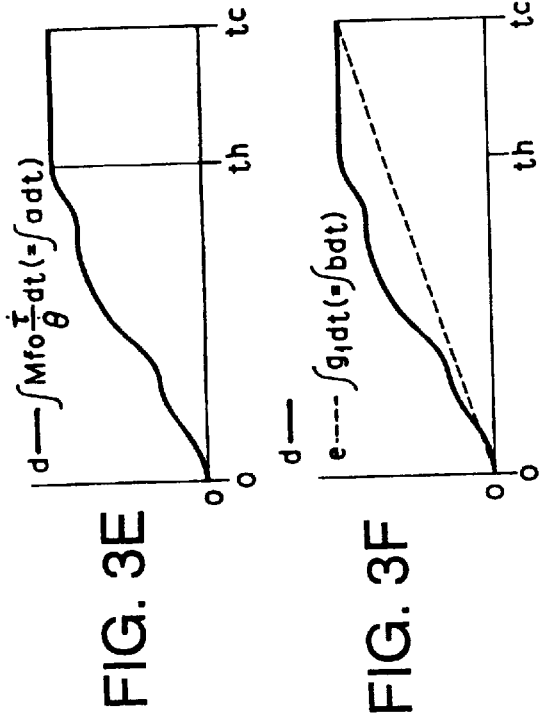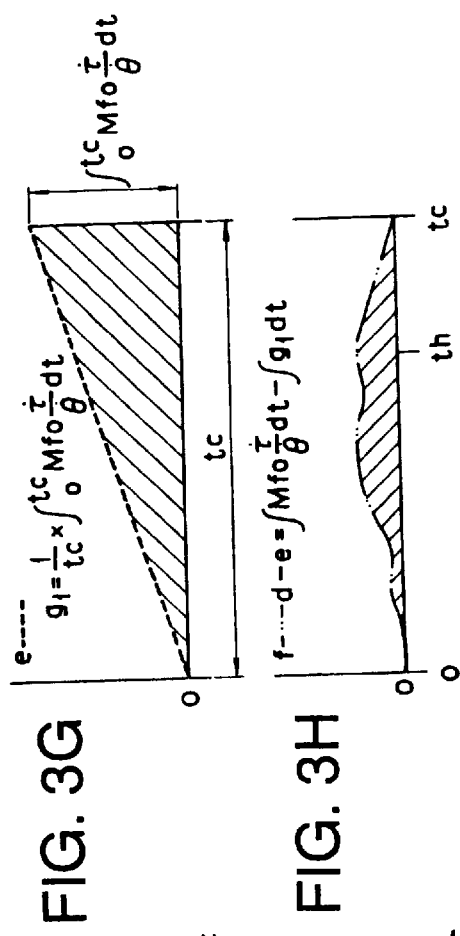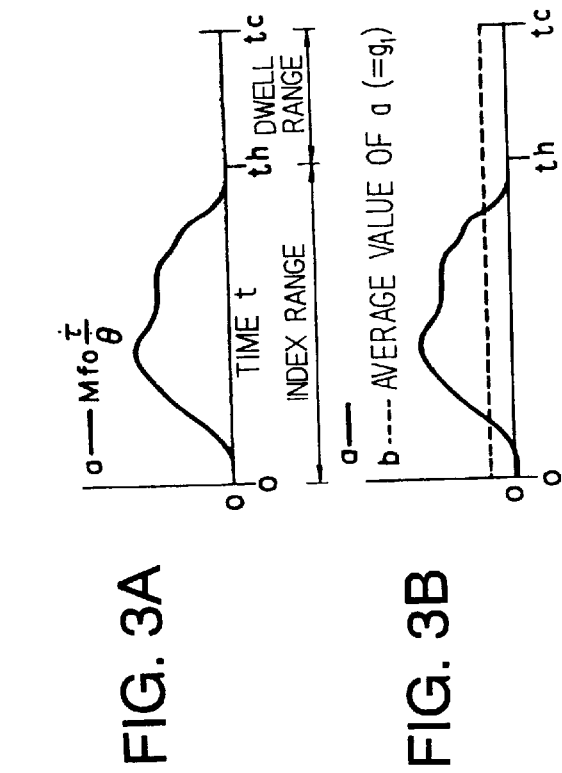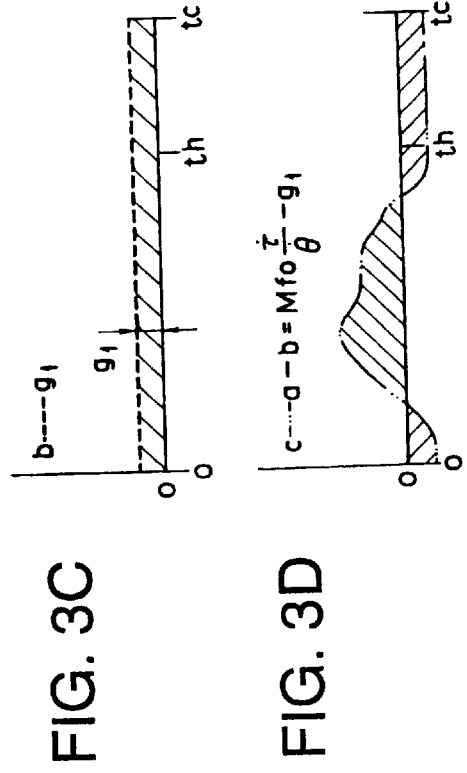

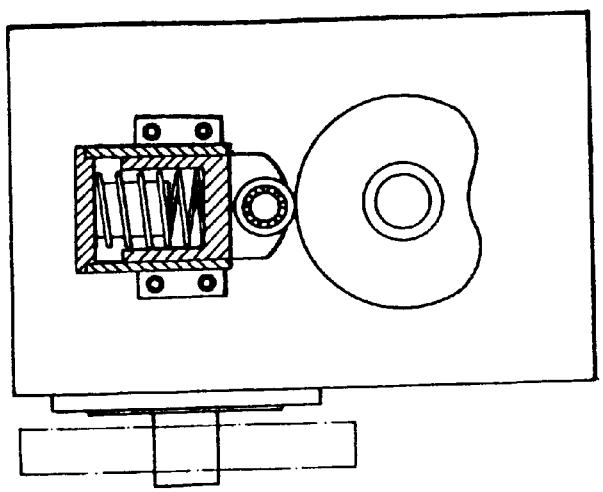
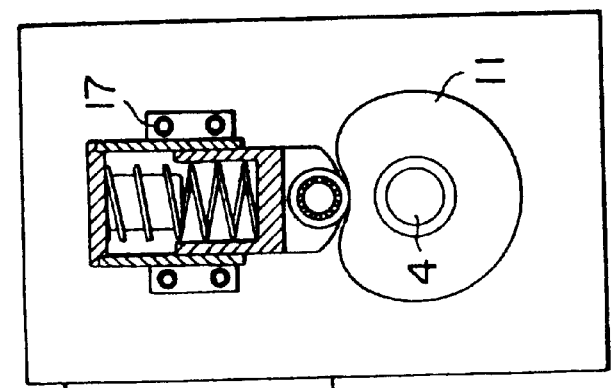
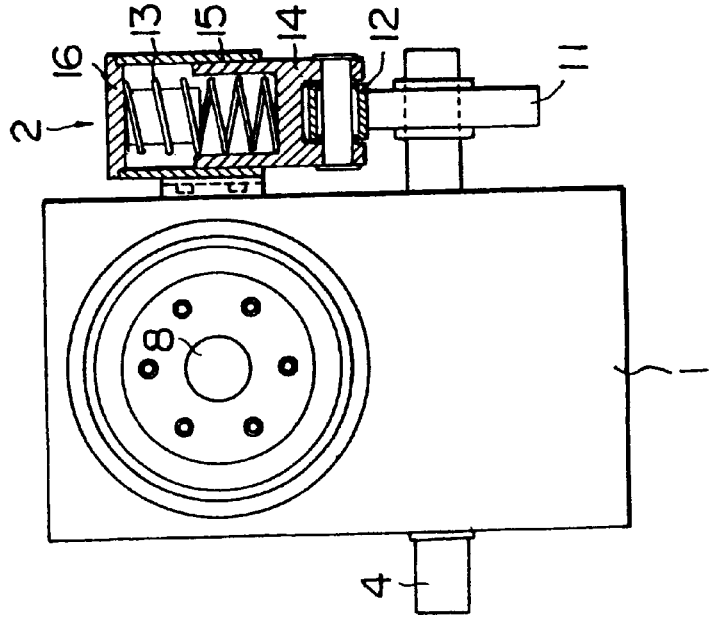

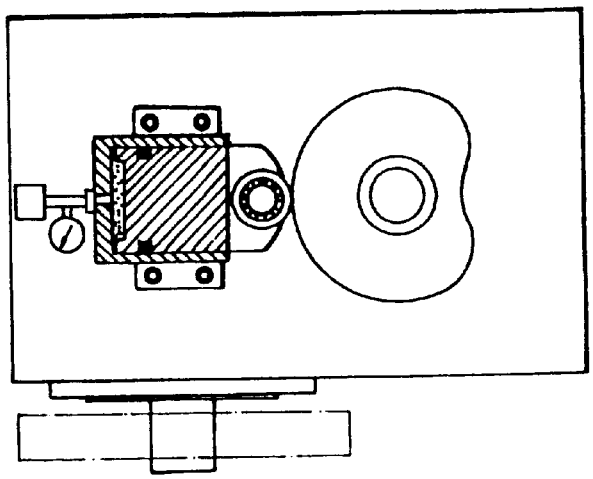
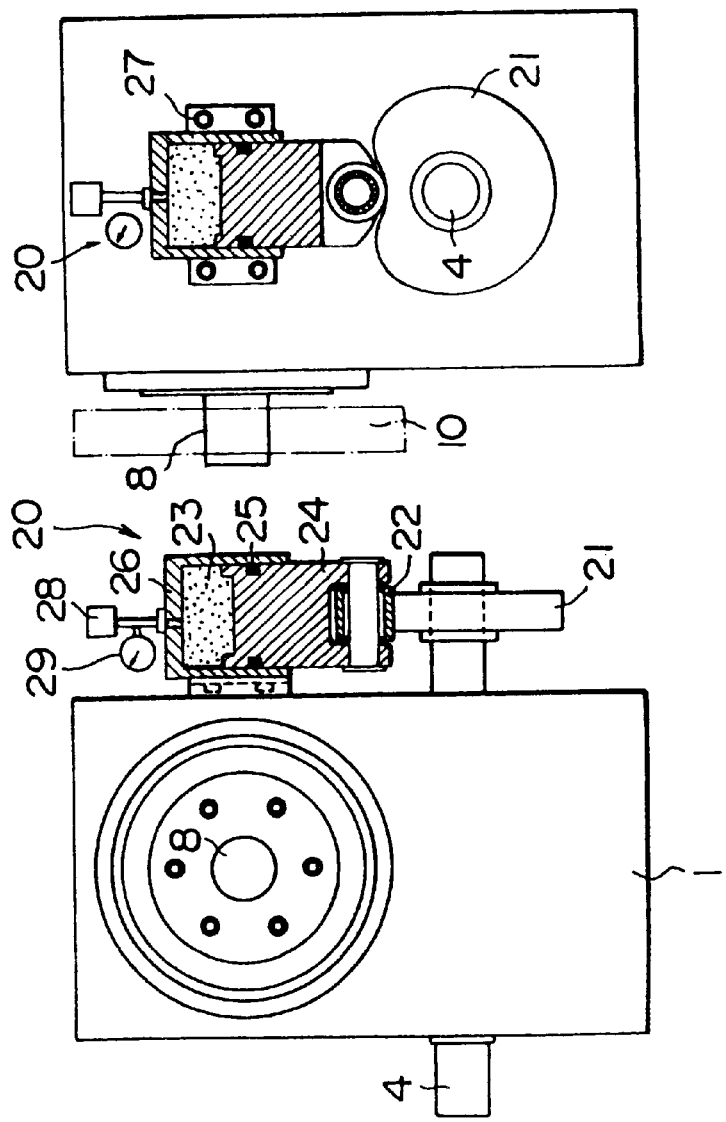

MOTION CONVERSION APPARATUS

BACKGROUND OF THE INVENTION

1. Field of the Invention

This invention relates to a motion conversion apparatus for converting a continuous rotational motion into a specific rotational motion, such as an intermittent rotational motion and a swinging rotational motion, or a motion of the predetermined type such as a combination of such rotational motions and a combination of such rotational motion and a rectilinear motion.

2. Related Art

Generally, a motion conversion apparatus comprises an input shaft connected to a driving device such as a motor, and an output shaft connected to a driven member such as a turntable or a conveyor, and a continuous rotational motion of the input shaft is converted to a motion of the output shaft through the cam mechanism, and this converted motion is transmitted to the driven member through the output shaft.

In such a motion conversion apparatus, during the positioning, a continuously-varying torque, acting on the output shaft during the positioning, as well as a reaction force of this torque, act as a fluctuation torque on the input shaft, thereby preventing the uniform rotation of the input shaft, so that the vibrations and a positioning error resulting therefrom develop during the positioning. Therefore, the motion conversion apparatus has been provided with a torque compensation device (as disclosed in Japanese Patent Unexamined Publication No. 54-159) so as to cancel the fluctuation torque of the input shaft which is produced by a conservative force such as an inertia force.

In this motion conversion apparatus, however, when a large fluctuation torque acts on the input shaft, an inertia body must be increased in accordance with this large fluctuation torque, and therefore the size of the apparatus may be increased. Therefore, as a method of effectively canceling such fluctuation torque, a torque compensation device of the air spring type as disclosed in Japanese Patent Unexamined Publication No. 1-120472 has been proposed.

This motion conversion apparatus produces a torque totally reverse to a fluctuation torque produced when a continuous rotational motion of an input shaft is converted into a motion of an output shaft, and this torque is caused to act on the input shaft, thereby canceling the produced fluctuation torque. The magnitude of the torque to be applied to the input shaft is adjusted by the positioning of a cam follower, engaged with a torque compensation cam provided in the apparatus and having a pre-calculated cam curve, and by a reciprocal movement of a piston moved in a cylinder in accordance with the movement of the cam follower. With this construction, the input shaft torque becomes uniform, and has a value close to zero throughout one cycle, that is, over the entire range of rotation of the input shaft through 360 degrees, and therefore adverse effects of the fluctuation torque in the motion conversion apparatus can be eliminated, and also the capacity of a drive motor can be reduced.

However, in the motion conversion apparatus disclosed in Japanese Patent Unexamined Publication No. 1-120472, attention is directed to the conserving energy such as the inertia load of the output shaft and the spring force acting on the output, and any consideration has not been given to the torque fluctuation due to a non-conserving, dissipating force such as a frictional force acting on the output shaft. Such frictional force is converted and dissipated by heat and so on, and this frictional force has heretofore been regarded as a necessary minimum energy loss, and there has heretofore existed no opinion that the fluctuation torque due to this frictional force should be compensated for. However, in some specific cam mechanisms, the frictional force is dominant, and can not be disregarded, and there is no conventional technique for dealing with such a case.

SUMMARY OF THE INVENTION

With the above problems in view, it is an object of this invention to provide a motion conversion apparatus having a torque compensation device which can cancel not only a fluctuation torque acting on an input shaft due to an inertia load but also part of a fluctuation torque acting on the input shaft due to a frictional load, and also can reduce a disadvantage, caused by the fluctuation torque which can not be canceled, to a minimum.

The inventor of the present invention has made an extensive study, and has found that a fluctuation torque portion, obtained by subtracting, from a fluctuation torque acting on an input shaft due to a frictional load, an average value or its approximate value of this fluctuation torque, has periodicity, and can be canceled.

The term "average value" of the fluctuating torque means the torque value obtained by averaging the value of the torque which acts on the input shaft during the full revolution (i.e., rotation through 360 degrees) of the input shaft, and varies continuously. The torque, obtained by subtracting, from the torque varying during one rotation of the input shaft, the above average value (which is constant over an entire range of one rotation) or its approximate value of this varying torque, is the above fluctuation torque portion.

The present invention has been made in view of the above findings.

More specifically, according to the present invention, there is provided a motion conversion apparatus for converting a continuous rotational motion of an input shaft into a predetermined-type motion of an output shaft through a transmission cam device, comprising:

a torque compensation device comprising a cam connected to the input shaft, a cam follower, and a resilient force-producing device pressing the cam follower against the cam;

wherein a fluctuation torque portion, obtained by subtracting, from a fluctuation torque acting on the input shaft due to a frictional load acting on at least one of the input shaft and the output shaft when converting the motion of the input shaft into the motion of the output shaft through the transmission cam device, an average value or its approximate value of the fluctuation torque, and a fluctuation torque acting on the input shaft due to an inertia load when converting the motion of the input shaft into the motion of the output shaft, are canceled by a fluctuation torque applied to the input shaft by the positioning of the torque compensation device.

In one preferred form of the invention, the motion conversion apparatus is an intermittent drive apparatus for converting the continuous rotational motion of the input shaft into an intermittent rotational motion of the output shaft, and the torque compensation device applies the fluctuation torque, defined by the following formulas, to the input shaft:

$$M_{ic} + M_i - (g_1 + g_2) = 0 \quad \text{Formula 4}$$

$$g_1 = \frac{1}{t_c}\int_o^{t_c} M_{fo}\frac{\dot{\tau}}{\dot{\theta}} dt \quad \text{Formula 5}$$

$$g_2 = \frac{1}{t_c}\int_o^{t_c} M_f dt \quad \text{Formula 6}$$

where $M_{fo}$ represents a frictional torque of the output shaft, $M_f$ represents a frictional torque of the input shaft, $g_1$ represents an average value of the frictional torque acting on the input shaft, $g_2$ represents an average value of the frictional torque acting on the output shaft, tc represents the time elapsed from the start of the positioning (i.e., cycle time), θ represents an angle of rotation of the input shaft, τ represents an angle of rotation of the output shaft, $M_i$ represents the fluctuation torque exerted on the input shaft by the positioning of the transmission cam device, and $M_{ic}$ represents the fluctuation torque exerted on the input shaft by the positioning of the torque compensation device.

The resilient force-producing device may comprises a compression spring of a mechanical element or an air spring device for producing a resilient force by expanding and contracting the air. In the former case, it is preferred to provide a device for adjusting an initial compression force of the compression spring, and in the latter case, it is preferred to provide a device for adjusting an initial spring force of the air spring device.

Preferably, the torque compensation device includes a housing containing the cam, the cam follower, and the resilient force-producing device.

At those sections (intervals) at which the torque, acting on the input shaft, is relatively small, the above torque compensation device applies a torque, slightly larger than this torque, to the input shaft, and accumulates energy corresponding to the difference between these torques. In contrast, at those sections at which a very large torque acts on the input shaft, the torque compensation device releases the accumulated energy to produce a torque serving to relieve and cancel this large torque, thereby reducing this large torque. By thus repeating the accumulation and release of the energy, the whole of the torque acting on the input shaft can be stabilized, and also the peak value of the torque can be lowered.

In the present invention, not only the fluctuation torque, acting on the input shaft due to the inertia load, but also part of the fluctuation torque, acting on the input shaft due to the frictional load, are canceled by the torque compensation device, and therefore vibrations, developing during the positioning of the motion conversion apparatus, as well as an positioning error resulting therefrom, can be effectively reduced.

Out of the fluctuation torque acting on the input shaft, the torque which is not canceled by the torque compensation device is the torque of the above average value. To thus average or smooth the torque (that is, to lessen a torque fluctuation wave) acting on the input shaft also contributes to the reduction of vibrations during the positioning and to the reduction of an positioning error resulting therefrom. Further, by averaging the torque acting on the input shaft, so that the peak value of the torque acting on the input shaft is lowered, the rated capacity of a drive motor, which is selected in accordance with this peak value, can be reduced.

As is clear from the foregoing, the present invention achieves a marked effect when the fluctuation torque, acting on the input shaft due to the frictional load, is large.

BRIEF DESCRIPTION OF THE DRAWINGS

FIGS. 3A to 3H are illustrations showing a fluctuation torque acting on the input shaft due to a frictional load acting on the output shaft during the positioning of the motion conversion apparatus, the average value of the fluctuation torque, a fluctuation torque portion obtained by subtracting this average value from the fluctuation torque;

FIGS. 6A to 6C are views showing a first embodiment of a motion conversion apparatus of the invention, as well as an positioning thereof;

FIGS. 7A to 7C are views similar to FIG. 6, but showing a second embodiment of a motion conversion apparatus of the invention;

DESCRIPTION OF THE PREFERRED EMBODIMENTS OF THE INVENTION

Theory of the Invention

The theory of the present invention will first be described with reference to FIGS. 1 to 4.

Taking not only a torque due to an inertia load but also torques, acting on input and output shafts due to a frictional load, into consideration, the inventor of the present invention has derived a theoretical formula for smoothing or averaging a torque fluctuation acting on the input shaft during the positioning of a motion conversion apparatus.

Here, let's assume that a motion conversion apparatus has an operating system of the type in which an input shaft is continuously rotated while an output shaft or a follower is intermittently rotated, and a study will be made of a displacement curve of a compensation cam of a compensation system so that a fluctuation torque Mi of the input shaft, acting on this operating system, can be balanced with a torque Mic acting on the torque compensation cam device (TCC) which is the compensation system for this conversion apparatus. Here, the follower of the operating system is a rotation system•single inertia load, and the follower of the compensation system is a spring-type translating follower, and an inertia force of the follower of the compensation system can be ignored.

In FIGS. 1 to 4, the following is provided:

$F_o$: initial force of torque compensation cam device (TCC) spring

I: second moment of inertia of output shaft $k_c$: TCC spring constant t: time $t_c$: cycle time $t_h$: positioning time $y_c$: TCC displacement $y_h$: TCC stroke θ: rotational angle of input shaft $θ_h$: indexing angle or (indexing period)

τ: rotational angle of output shaft $τ_h$: (angular) stroke of output shaft

Figure 1C:
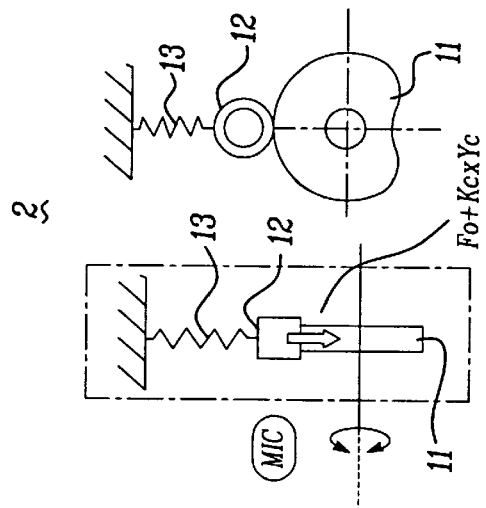
FIGS. 1A to 1D are schematic views showing a motion conversion apparatus serving as an intermittent drive apparatus (having a torque compensation device) for converting a continuous rotational motion of an input shaft into an intermittent rotational motion of an output shaft by the use of a cam and a turret, and also showing torques produced during the positioning of the motion conversion apparatus, as well as the principle of compensation for the torques.
Figure 1B:
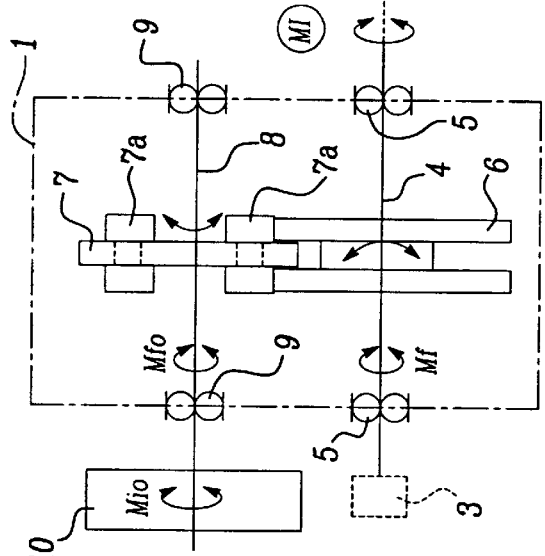
Figure 1A:
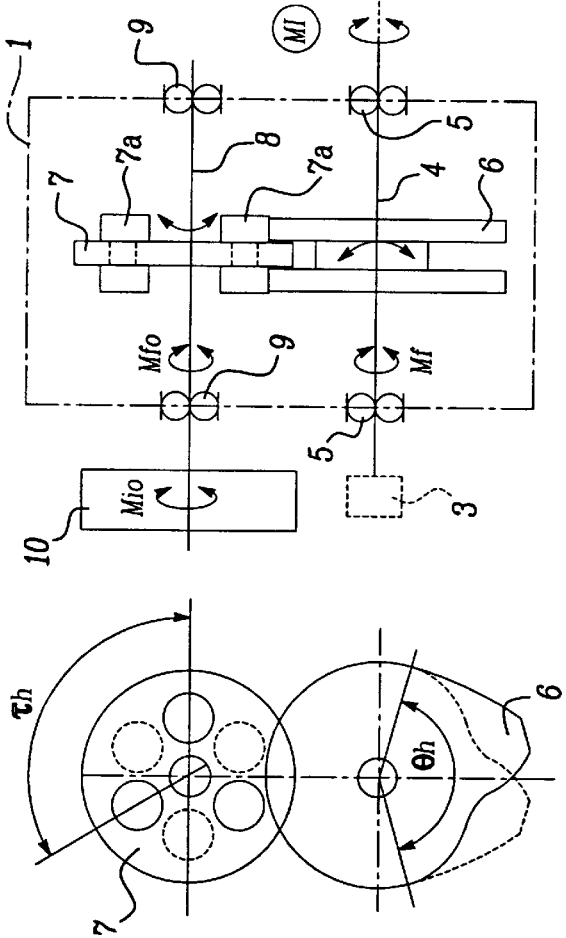
Figure 1D:
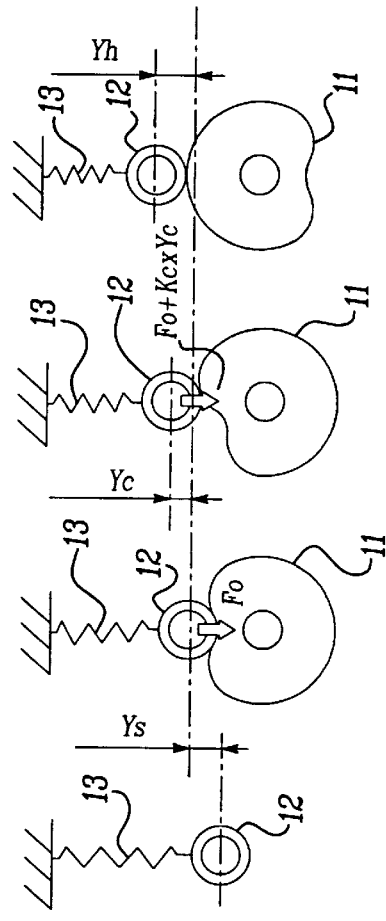

FIG. 1 is a schematic illustration of the motion conversion apparatus for explaining this theory, and FIG. 1A is a side-elevational view of a motion conversion apparatus body 1, FIG. 1B is a view of the motion conversion apparatus as seen from the front side thereof, FIG. 1C is a side-elevational view of the torque compensation device (TCC) 2, and FIG. 1D is a view showing the positioning of the torque compensation device 2.

In FIG. 1, a drive pulley 3 transmits a drive force from a driving device (not shown), such as a motor, to the motion conversion apparatus body 1 via an input shaft 4. The input shaft 4 is supported by bearings 5, and an index cam 6 is mounted on the input shaft 4. The index cam 6 is engaged with cam followers 7a of a turret 7 mounted on an output shaft 8, and the output shaft 8 is supported by bearings 9, and an inertia body is mounted on a distal end of the output shaft 8. The torque compensation device 2 is mounted on one end portion of the input shaft 4 remote from the drive pulley 3, and this torque compensation device 2 comprises a compensation cam 11, a cam follower 12, and a spring member 13. The index cam 6, the turret 7 and so on constitute a transmission cam device for converting a continuous rotational motion of the input shaft 4 into an intermittent rotational motion of the output shaft 8.

Figure 2A:
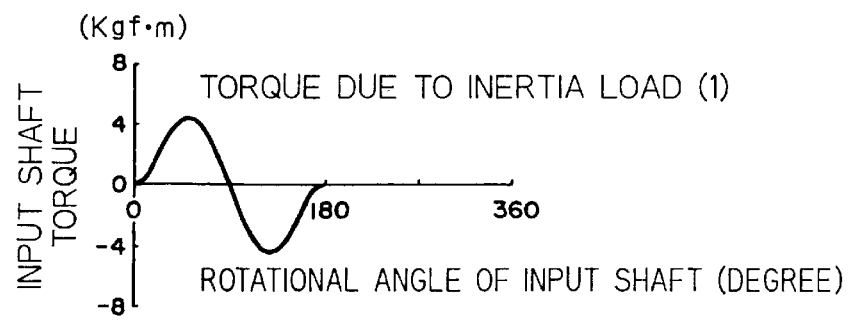
FIGS. 2A to 2E are illustrations showing a torque acting on the input shaft due to an inertia load during the positioning of the motion conversion apparatus of FIG. 1, a torque on the input shaft due to a frictional load, a combination of these torques, a torque produced by the torque compensation device, and a remaining torque not compensated for by the torque compensation device.
Figure 2B:
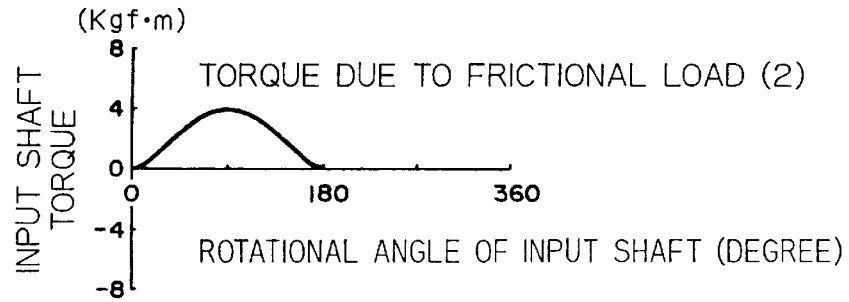
Figure 2C:
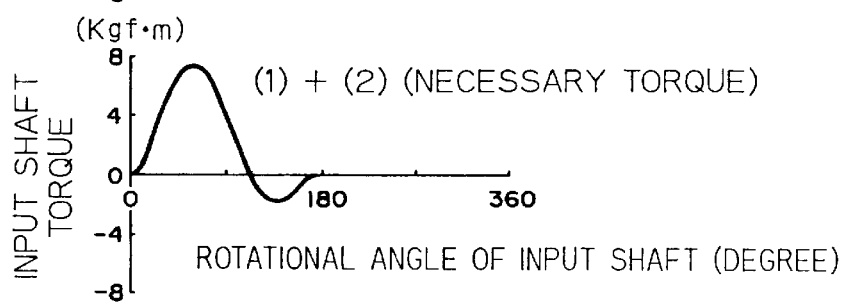
Figure 2D:
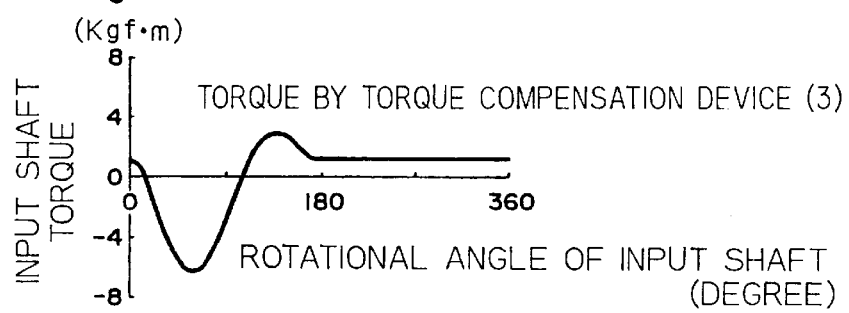
Figure 2E:
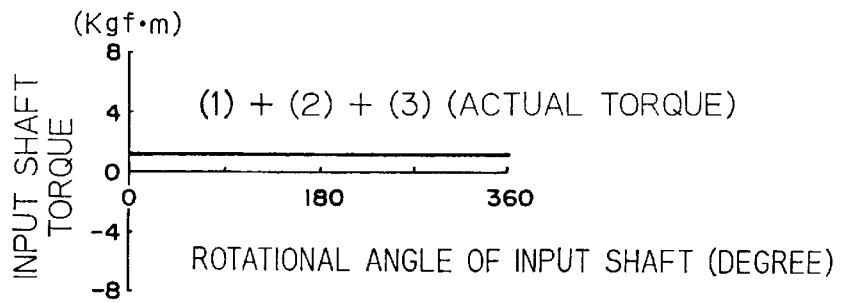

FIG. 2 is an illustration showing torques acting on the input shaft 4 during the operation of the motion conversion apparatus of FIG. 1, and FIG. 2A shows a torque $M_{io}$ due to an inertia load, FIG. 2B shows a torque $(M_{fo}+M_f)$ due to a frictional load, FIG. 2C shows a torque $M_i$ acting on the input shaft due to (1)+(2), FIG. 2D shows a torque $M_{ic}$ produced by the torque compensation device, and FIG. 2E shows a torque actually acting on the input shaft 4, that is, the remaining torque which is not compensated for.

In the present invention, for example, the torque $M_i$ (as shown in FIG. 2C) acting on the input shaft is canceled by the torque $M_{ic}$ as shown in FIG. 2D so that only the smoothed torque as shown in FIG. 2E can remain.

FIG. 3 is an illustration showing the fluctuation torque $M_{fc}$ acting on the input shaft due to a frictional load or a frictional torque acting on the output shaft, and a curve a of FIG. 3A represents the fluctuation torque $M_{fo}$ during one rotation (through 360 degrees) of the input shaft. An index section or range in FIG. 3A is a period or range during which the turret 7 rotates together with the output shaft 8, and a dwell section or range is a period or range during which the turret is stationary. FIG. 3B shows the curve a of the fluctuation torque of FIG. 3A and a straight line b of FIG. 3C, obtained by averaging this torque curve a, in a superimposed manner, and FIG. 3D shows a torque curve c obtained by subtracting the straight line b of FIG. 3C from the curve a of FIG. 3A, and FIG. 3E shows a curve d obtained by integrating the torque fluctuation of FIG. 3A to obtain accumulation per time, and FIG. 3F shows a straight line e along which the energy is consumed from the curve d of FIG. 3E uniformly per time, and FIG. 3G shows the gradient of the straight line e of FIG. 3F, and FIG. 3H shows a curve f obtained by subtracting the straight line e of FIG. 3G from the curve d of FIG. 3E.

FIG. 4 shows the fluctuation torque $M_f$ acting on the input shaft due to a frictional load or a frictional torque acting on the input shaft, and FIGS. 4A to 4H are similar to FIGS. 3A to 3H, respectively, but are related to this fluctuation torque $M_f$.

In FIG. 1, if the inertia load torque of the output shaft 8 of the operating system is represented by $M_{io}$, and the frictional torque of the output shaft 8 is represented by $M_{fo}$, then the torque $M_t$ acting on the output shaft 8 is expressed by the following formula:

$$M_t = M_{io} + M_{fo}$$

Here, the torque compensation is effected on the input shaft 4, and therefore conversion is effected to determine how much the torque, produced on the output shaft 8, influences the input shaft 4. (In the case of an index mechanism, an output shaft does not make one rotation even when an input shaft makes one rotation, and there are an interval (that is, index section or range) at which an indexing rotation of a predetermined angle is effected, and an interval (that is, dwell section or range) at which the output shaft is stationary, and the torque of the output shaft does not entirely act on the input shaft, and therefore the special conversion is needed.)

If the torque produced on the input shaft 4 is represented by $M_{it}$, the amount of work done by the output shaft 8 for a very small time dt is represented by $M_t \cdot dτ$, and the amount of work done by the input shaft 4 for the very small time dt is represented by $M_{it} \cdot dθ$. Here, assuming that the efficiency of conversion from the output shaft 8 to the input shaft 4 is 100%, the two shafts have the same work amount according to the principle of virtual work, and therefore if the frictional torque of the input shaft 4 is represented by $M_f$, the input shaft torque $M_i$ is expressed by the following formula:

$$M_t \cdot d\tau = M_{it} \cdot d\theta \qquad \text{Formula 7}$$

$$\therefore M_{it} = M_t \cdot \frac{d\tau}{d\theta} = M_t \cdot \frac{\dot{\tau}}{\dot{\theta}} = (M_{io} + M_{fo}) \cdot \frac{\dot{\tau}}{\dot{\theta}}$$

If the frictional torque of the input shaft 4 is represented by $M_f$, the input shaft torque $M_i$ to be found is expressed by the following formula:

$$M_i = M_{it} + M_f = (M_{io} + M_{fo}) \cdot \frac{\dot{\tau}}{\dot{\theta}} + M_f \qquad \text{Formula 8}$$

The input shaft torque $M_{ic}$, produced by the torque compensation device 2 (serving as the compensation system), can be found in a similar manner. A force $F_c$, produced by resilient deformation of the spring member 13 provided in the torque compensation device 2, is expressed by the following formula:

$$F_c = F_o + k_c \cdot y_c$$

where $F_o$ represents an initial force of the spring member 13, $k_c$ represents the spring constant, and $y_c$ represents the amount of displacement of the cam follower 12.

Here, for the same reason described above for the operating system, conversion (calculation) is effected to determine the torque applied to the input shaft 4 by this spring force. Assuming that the two have the same amount of work for a very small time dt as in the above case, the work amount on the operating portion (i.e., the spring member 13) is represented by $F_c \cdot dy_c$, and the work amount on the input shaft 4 is represented by $M_{ic} \cdot d\theta$, and therefore the following formula is established:

$$F_c \cdot dy_c = M_{ic} \cdot d\theta$$

Therefore, the torque $M_{ic}$, exerted on the input shaft by the TCC mechanism, is expressed by the following formula:

$$M_{ic} = F_c \cdot \frac{dy_c}{d\theta} = (F_o + k_c \cdot y_c) \cdot \frac{dy_c}{d\theta} \qquad \text{Formula 9}$$

$$= (F_o + k_c \cdot y_c) \cdot \frac{\dot{y}_c}{\dot{\theta}}$$

Here, in order to cancel the fluctuation torque acting on the input shaft 4, it is only necessary that the torque of the operating system and the torque of the compensation system satisfy a torque equilibrium condition formula, $M_i + M_{ic} = 0$.

Therefore, it is assumed that $M_i + M_{ic} = 0$ is established, and the displacement of TCC is found. Since a term of a first derivative of $y_c$ is included, the integration with time t is effected, and this is represented by G(t) as follows:

$$G(t) = \int (M_i + M_{ic}) dt \qquad \text{Formula 10}$$

Here, from $\dfrac{\theta}{\theta_h} = \dfrac{t}{t_h}$, $\theta = \dfrac{\theta_h}{t_h} \cdot t$ is obtained.

From $d\theta = \dfrac{\theta_h}{t_h} dt$, $\dot{\theta} = \dfrac{\theta_h}{t_h}$ is obtained.

Further, since $M_{io} = I \cdot \ddot{\tau}$ is established, the following formula is derived:

$$G(t) = \frac{I \cdot t_h \cdot (\dot{\tau})^2}{2\theta_h} + M_{fo} \cdot \frac{t_h \cdot \tau}{\theta_h} + \qquad \text{Formula 11}$$

$$M_f \cdot t + \frac{F_o \cdot t_h}{\theta_h} \cdot y_c + \frac{k_c \cdot t_h}{2\theta_h} \cdot y_c^2$$

Examination will be made of whether or not the periodicity can be established with respect to this formula.

For establishing the periodicity, the cam follower 12 need to be returned to its initial position (start position) when the cam 11 of TCC completes the full revolution, that is, $[y_c(0) = y_c(t_c)]$ need to be established. In view of the periodicity of the cam mechanism, this indicates that with t=0 and $t=t_c$, $G(0) = G(t_c)$ is established with respect to G(t).

In Formula 11, the first term is related to $\tau$, and the same speed change is always effected during one cycle (that is, one rotation of the input shaft), and therefore the periodicity is ensured. The fourth term and the fifth term are related to $y_c$, and under the set conditions, this $y_c$ must have periodicity.

What matters with this formula are $M_{fo}$ of the second term and $M_f$ of the third term, but these terms are related to the torques due to frictional forces, and these are dissipated as heat, and hence do not usually have periodicity. Therefore, in order to ensure the periodicity of $M_{fo}$ and $M_f$, $g_1$ and $g_2$ are introduced as follows. $g_1$ means the inclination of the straight line e of FIGS. 3F and 3G, and $g_2$ means the inclination of the straight line e of the FIGS. 4F and 4G, and these inclinations, obtained when time $t_c$ is represented by the abscissa axis while the integrated value of the fluctuation torque is represented by the ordinate axis, represent values of $g_1$ and $g_2$, respectively, and therefore the following formulas are established:

$$g_1 = \frac{1}{t_c} \int_o^{t_c} M_{fo} \frac{\dot{\tau}}{\dot{\theta}} dt \qquad \text{Formula 12}$$

$$g_2 = \frac{1}{t_c} \int_o^{t_c} M_f dt \qquad \text{Formula 13}$$

Figure 4A:
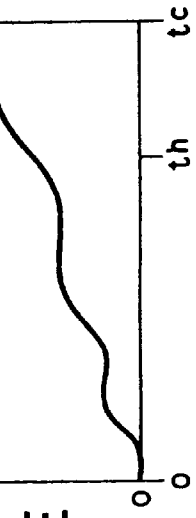
FIGS. 4A to 4H are illustrations showing a fluctuation torque acting on the input shaft due to a frictional load acting on the input shaft during the positioning of the motion conversion apparatus, the average value of the fluctuation torque, a fluctuation torque portion obtained by subtracting this average value from the fluctuation torque.
Figure 4B:
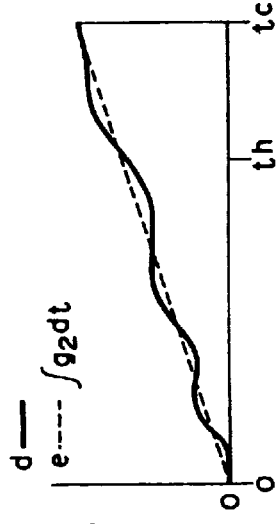
Figure 4C:
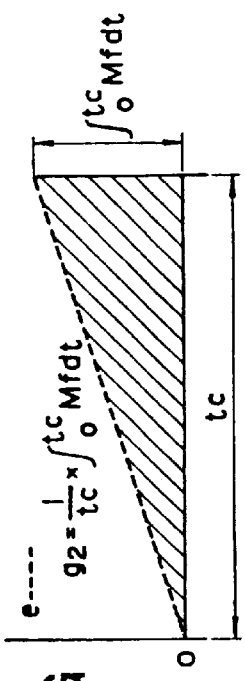
Figure 4D:
Figure 4E:
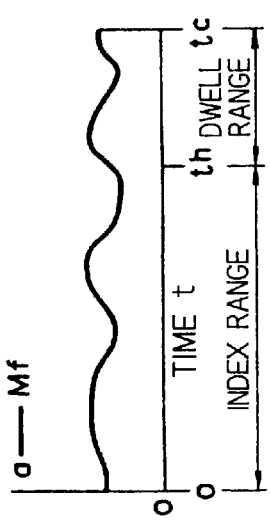
Figure 4F:
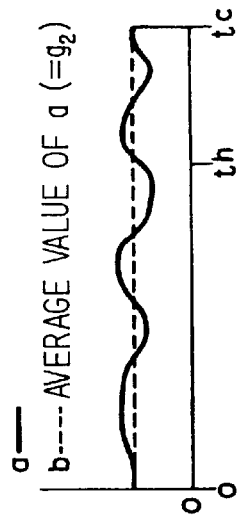
Figure 4G:
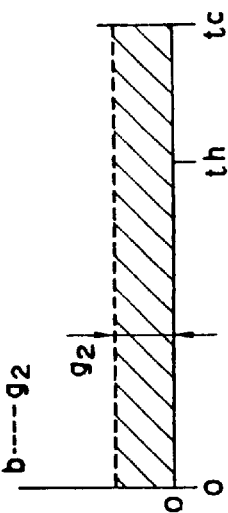
Figure 4H:
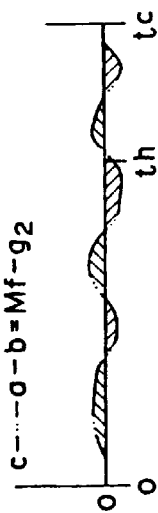

Hatched portions in FIGS. 3G and 4G represent dissipating energy, and at present this dissipating energy can not be converted into another form of energy with any means, and therefore can not be incorporated into the system. In other words, with the lapse of one cycle $t_c$, the energy, indicated by the hatched portions in FIGS. 3G and 4G, never fails to be consumed.

Consideration is again given to the periodicity of the frictional torque on the basis of this thought, and from the curve of FIG. 3H obtained by subtracting, from the curve of FIG. 3E, the amount of the energy (indicated by the hatched portion in FIG. 3G) consumed during one cycle, it will be appreciated that the amount of the energy at the time of t=0 is equal to the amount of the energy upon lapse of one cycle (that is, $t=t_c$). This indicates that the periodicity is ensured, and namely it can be thought that the periodicity is ensured for the energy obtained by subtracting the energy of FIG. 3G

(FIG. 4G) from the energy of FIG. 3E (4E). Namely, if the following formulas are established, it can be thought that the periodicity is ensured.

$$\int M_{fo} \cdot \frac{\dot{\tau}}{\dot{\theta}} dt - \int g_1 dt = \left( M_{fo} \cdot \frac{t_h \cdot \tau}{\theta_h} - g_1 \cdot t \right)$$ Formula 14

$$\int M_f dt - \int g_2 dt = (M_f \cdot t - g_2 \cdot t)$$

Based on this, the following torque equilibrium condition formula to ensure the periodicity is established:

$$M_f + M_{ic} - (g_1 + g_2) = 0$$ Formula 15

To solve the above Formula 15, the integration by time t is effected as in the above case since a term of a first-floor differential is included, and as a result the following formula is obtained:

$$\int \{M_i + M_{ic} - (g_1 + g_2)\} dt =$$ Formula 16

$$\frac{I \cdot t_h \cdot (\dot{\tau})^2}{2\theta_h} + M_{fo} \cdot \frac{t_h \cdot \tau}{\theta_h} + M_f \cdot t +$$

$$\frac{F_o \cdot t_h}{\theta_h} \cdot y_c + \frac{k_c \cdot t_h}{2\theta_h} \cdot y_c^2 - (g_1 + g_2) + C = 0$$

From the initial conditions (t=0, τ=0, $y_c=y_o$), the integral constant C is expressed by the following formula:

$$C = -\left( \frac{t_h \cdot F_o}{\theta_h} \cdot y_o + \frac{t_h \cdot k_c}{2\theta_h} \cdot y_o^2 \right)$$ Formula 17

From the above, the following formula is provided:

$$\frac{I \cdot t_h \cdot (\dot{\tau})^2}{2\theta_h} + M_{fo} \cdot \frac{t_h \cdot \tau}{\theta_h} + M_f \cdot t + \frac{F_o \cdot t_h}{\theta_h} \cdot y_c +$$ Formula 18

$$\frac{k_c t_h}{2\theta_h} \cdot y_c^2 - (g_1 + g_2) - \left( \frac{t_h \cdot F_o}{\theta_h} \cdot y_c + \frac{t_h \cdot k_c}{2\theta_h} \cdot y_o^2 \right) = 0$$

When this formula is solved with respect to $y_c$, the following formula is obtained:

$$y_c = \frac{-F_o + \sqrt{F_o^2 - k_c \cdot D}}{k_c}$$ Formula 19

Here, D is expressed by the following formula:

$$D = I \cdot (\dot{\tau})^2 + 2M_{fo} \cdot \tau + 2 \frac{\theta_h}{t_h} \{M_f \cdot t - (g_1 + g_2) \cdot t\} -$$ Formula 20

$$2F_o \cdot y_o - k_c \cdot y_o^2$$

Thus, the displacement function of TCC, which incorporates the frictional force, and has the periodicity, can be obtained.

As is clear from the foregoing, in the motion conversion apparatus, with reference to FIGS. 1 to 4, if the torque compensation device is suitably designed by determining the configuration and so on of the compensation cam 11 according to Formulas 19 and 20, the proper torque compensation can be effected.

Briefly stated, the features of this motion conversion apparatus are as follows:

(a) This motion conversion apparatus compensates for the torque acting on the input shaft due to the inertia load as in a conventional apparatus, and the compensation cam 11 has such a configuration as to compensate for (that is, cancel) not only the torque, acting on the input shaft due to the inertia load, but also part of the torque due to the frictional load.

Figure 5:
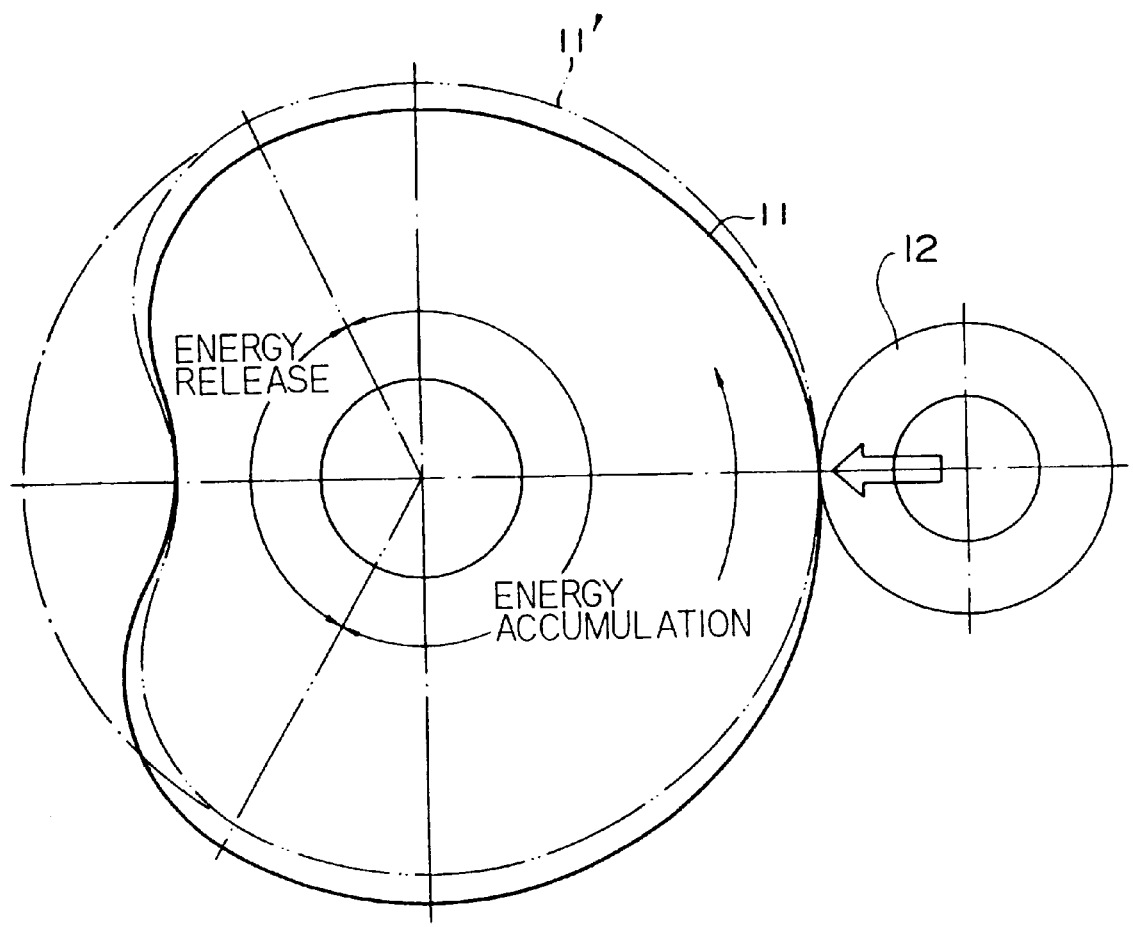
FIG. 5 is a view showing one example of a configuration of a torque compensation cam, obtained based on the principle of the present invention, in comparison with a configuration of a conventional torque compensation cam.

The configuration of the compensation cam, determined only in view of the torque acting on the input shaft due to the inertia load, is shown in a two dots-and-dash line 11' in FIG. 5, and the configuration of the compensation cam, determined in view of the frictional load, is shown in a solid line 11.

(b) This motion conversion apparatus compensates for part of the fluctuation torque acting on the input shaft due to the frictional load acting on the output shaft (that is, a fluctuation torque portion (see FIGS. 3D and 3H) obtained by subtracting the average value (see FIGS. 3C and 3G) of this fluctuation torque from this fluctuation torque (see FIGS. 3A and 3E)).

(c) This motion conversion apparatus compensates for part of the fluctuation torque acting on the input shaft due to the frictional load acting on the input shaft (that is, a fluctuation torque portion (see FIGS. 4D and 4H) obtained by subtracting the average value (see FIGS. 4C and 4G) of this fluctuation torque from this fluctuation torque (see FIGS. 4A and 4E)).

(d) Those torques, which can not be compensated for by this motion conversion apparatus, are the above average values (see FIGS. 3C, 3G, 4C and 4G), and are non-fluctuating, smoothed torques.

Embodiments

Preferred embodiments of the present invention will be described.

FIG. 6 shows a first embodiment of a motion conversion apparatus of the present invention, and more specifically FIG. 6A is a partly cross-sectional, front-elevational view of the apparatus, FIG. 6B is a side-elevational view of the apparatus, showing a energy-releasing condition, and FIG. 6C is a side-elevational view of the apparatus, showing an energy-accumulating condition. Those constituent elements of this embodiment similar to those of FIG. 1 will be designated by like reference numerals, and explanation thereof will be omitted.

In this first embodiment, there is provided a torque compensation device 2 similar to that shown in FIG. 1. The torque compensation device 2 comprises a torque compensation cam 11 mounted on an input shaft 4, a cam follower 12, and a resilient force-producing device. The resilient force-producing device comprises a spring member 13 (which is in the form of a compression spring of a mechanical element) received within a housing comprising a slide guide and a spring retainer 16. The spring member 13 presses the cam follower 12, rotatably mounted on a slider 14, against the torque compensation cam 11. The unit, comprising the resilient force-producing device and the cam follower 12, is fixedly secured to a side surface of a motion conversion apparatus body 1 by mounting bolts 17.

During the positioning of the motion conversion apparatus, a continuous rotational motion, applied to the input shaft 4, is transmitted to an output shaft 8 via a transmission cam device mounted in the motion conversion apparatus body 1, thereby converting this rotational motion, and at the same time, torque compensation cam 11, mounted on the input shaft 4, rotates to move the slider 14 upward and downward to contract and expand the spring member 13 and also to rotate the cam follower 12. The torque compensation cam 11 has a cam configuration designed according to the above-mentioned theoretical formula, and the torque compensation device 2 cancels a fluctuation torque acting on the input shaft 4 due to an inertia load when converting the rotational motion of the input shaft 4 into an intermittent rotational motion of the output shaft 8, and also cancels a fluctuation torque portion obtained by subtracting, from a fluctuation torque acting on the input shaft 4 due to a frictional load when effecting this motion conversion, the average value of this fluctuation torque. And besides, the fluctuation torque, acting on the input shaft 4 due to the frictional load, is smoothed or averaged, so that the peak value of the torque is lowered, thereby reducing vibrations and the like during the positioning.

FIG. 7 shows a second embodiment of a motion conversion apparatus of the invention, and more specifically FIG. 7A is a partly cross-sectional, front-elevational view of the apparatus, FIG. 7B is a side-elevational view of the apparatus, showing a energy-releasing condition, and FIG. 7C is a side-elevational view of the apparatus, showing an energy-accumulating condition.

Although the motion conversion apparatus of this second embodiment is similar to the apparatus of the first embodiment, a resilient force-producing device of a torque compensation device of the second embodiment is constituted not by a compression spring of a mechanical element as in the first embodiment, but by an air spring device. This air spring device comprises a piston 24 having at its end a cam follower 22 engaged with a torque compensation cam 21 of a configuration designed according to the above-mentioned theoretical formula, a cylinder 26, a seal member forming a seal between the piston 24 and the cylinder 26, an air source 28 for supplying the air into the cylinder 26, and a pressure control device 29. The pressure control device 29 controls the pressure of the air supplied from the air source 28 to the cylinder 26 so as to adjust the pressure of the air within the cylinder 26, that is, an initial spring force produced by this air spring device.

The construction of the second embodiment other than the above is similar to the construction of the first embodiment of FIG. 6, and the second embodiment operates in a manner similar to that of the first embodiment except that the torque is applied to the input shaft by the air spring device via the torque compensation cam 21. In the second embodiment, the unit, comprising the resilient force-producing device and the cam follower 22, is fixedly secured to a side surface of a motion conversion apparatus body 1 by mounting bolts 27.

Figure 8:
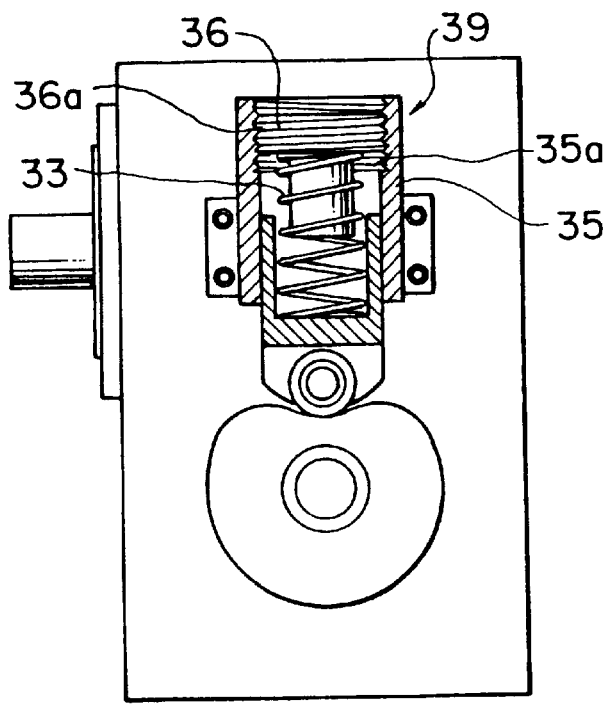
FIG. 8 is a partly cross-sectional, side-elevational view showing a third embodiment of a motion conversion apparatus of the invention.

FIG. 8 shows a third embodiment of the invention. This third embodiment is analogous to the first embodiment of FIG. 6, but differs therefrom in that there is provided an initial compression force-adjusting mechanism 39 for adjusting an initial compression force of a spring member 33. In this initial compression force-adjusting mechanism 39, an internally-threaded portion 35a is formed axially on an inner peripheral surface of a slide guide 35 over a predetermined distance, and an externally-threaded portion 36b, threadedly engaged with the internally-threaded portion 35a, is formed on an outer peripheral surface of a spring retainer 36, and by adjusting the position of the spring retainer 36 in the axial direction, the initial compression force of the spring 33 can be adjusted.

Figure 9:
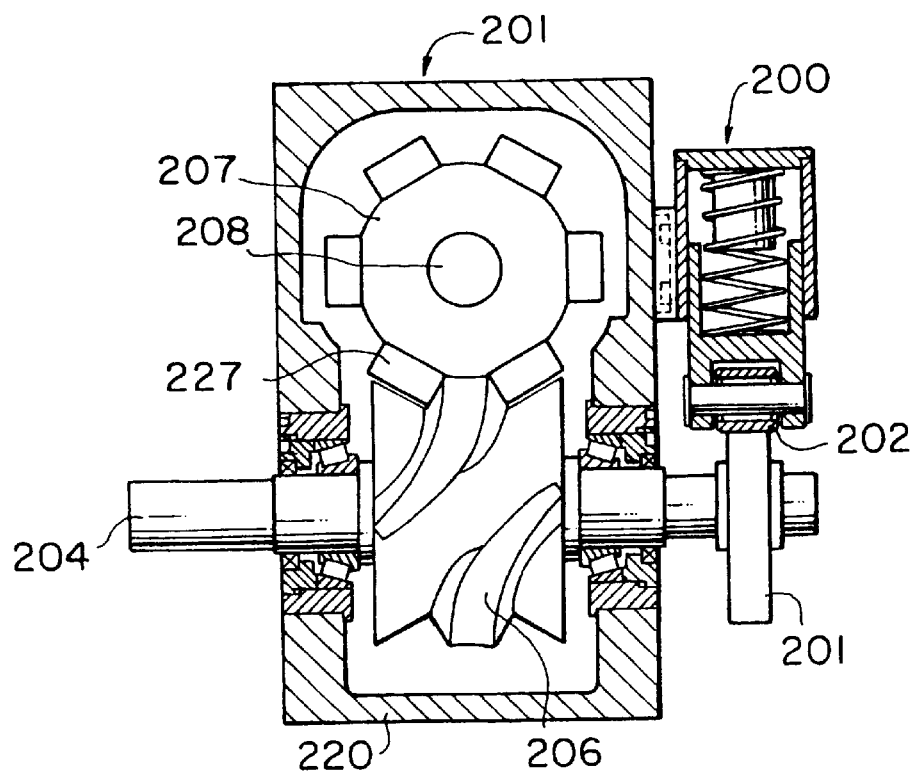
FIG. 9 is a cross-sectional view showing an indexing drive usable as a motion conversion apparatus body of the motion conversion apparatus of FIG. 1.

FIG. 9 shows an indexing drive 201 which can be used as the motion conversion apparatus body 1 of the motion conversion apparatus of the first embodiment shown in FIG. 6. This indexing drive 201, like a conventional construction, comprises an input shaft 204 for transmitting a rotational drive force, supplied from an external drive device, into a housing 220, an index cam 206 mounted on the input shaft 204, and a turret 207 which is mounted on an output shaft 208, and has cam followers 227 for rolling engagement with the index cam 206. Of course, instead of this indexing drive 201, a known parallel cam-type index or the like can be used.

The motion conversion apparatus of FIG. 9 comprises a torque compensation cam 201, a cam follower 202, and a torque compensation device 200 having a resilient force-producing device which are similar respectively to those of the first embodiment.

Figure 10:
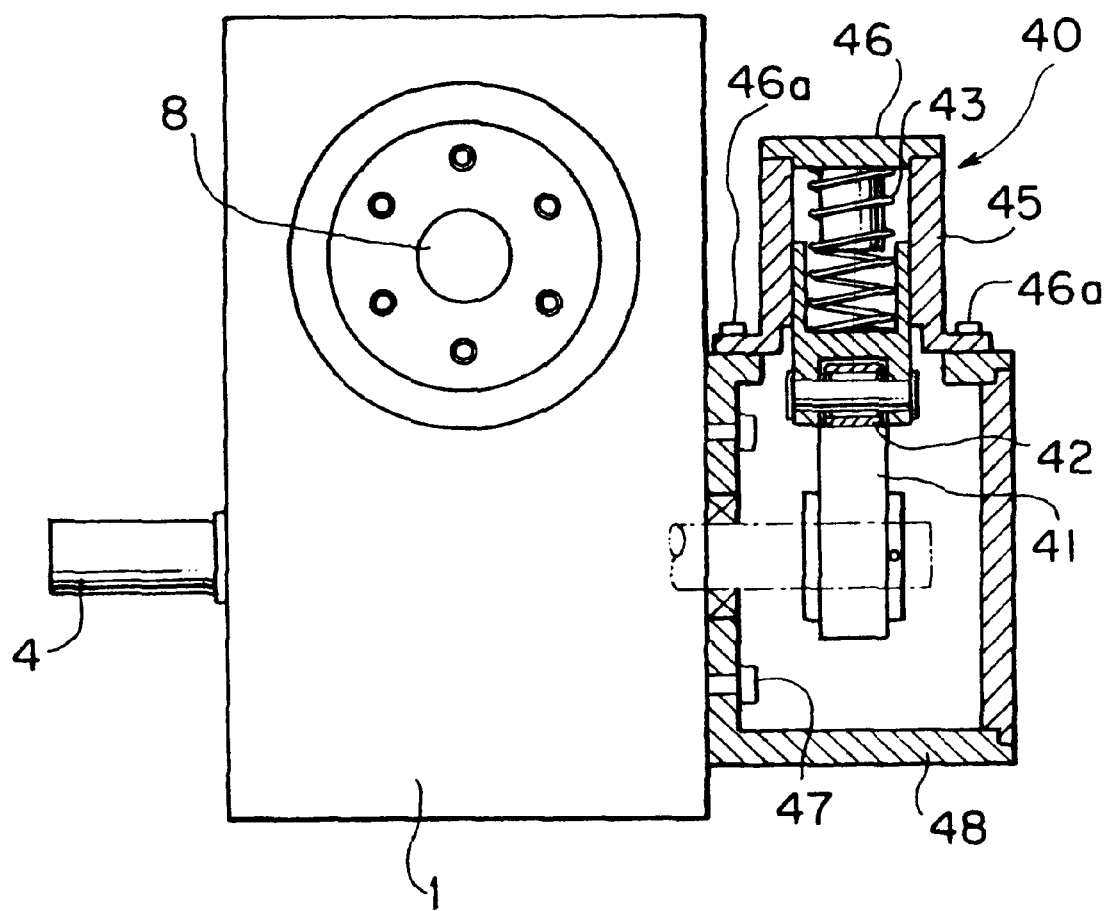
FIG. 10 is a partly cross-sectional, front-elevational view showing a fourth embodiment of a motion conversion apparatus of the invention.

FIG. 10 is a partly cross-sectional, front-elevational view of a fourth embodiment of the invention. In this fourth embodiment, a torque compensation device 40 comprises a housing 48 which contains a cam follower 42 and a torque compensation cam 41, and this housing 48 is fixedly secured to a side surface of a motion conversion apparatus body 1 by bolts 47. A slide guide 45 cooperates with a spring retainer 46 to provide a housing for a resilient force-producing device of a torque compensation device 40, and this slide guide 45 is integrally fixed to the housing 48 by bolts 46a. Thus, the cam follower 42, the torque compensation cam 41, and constituent elements of the resilient force-producing device are contained in the two housings integrally connected together. In this fourth embodiment, the resilient force-producing device is similar to that of the first embodiment shown in FIG. 6, and has a spring member 43.

Figure 11:
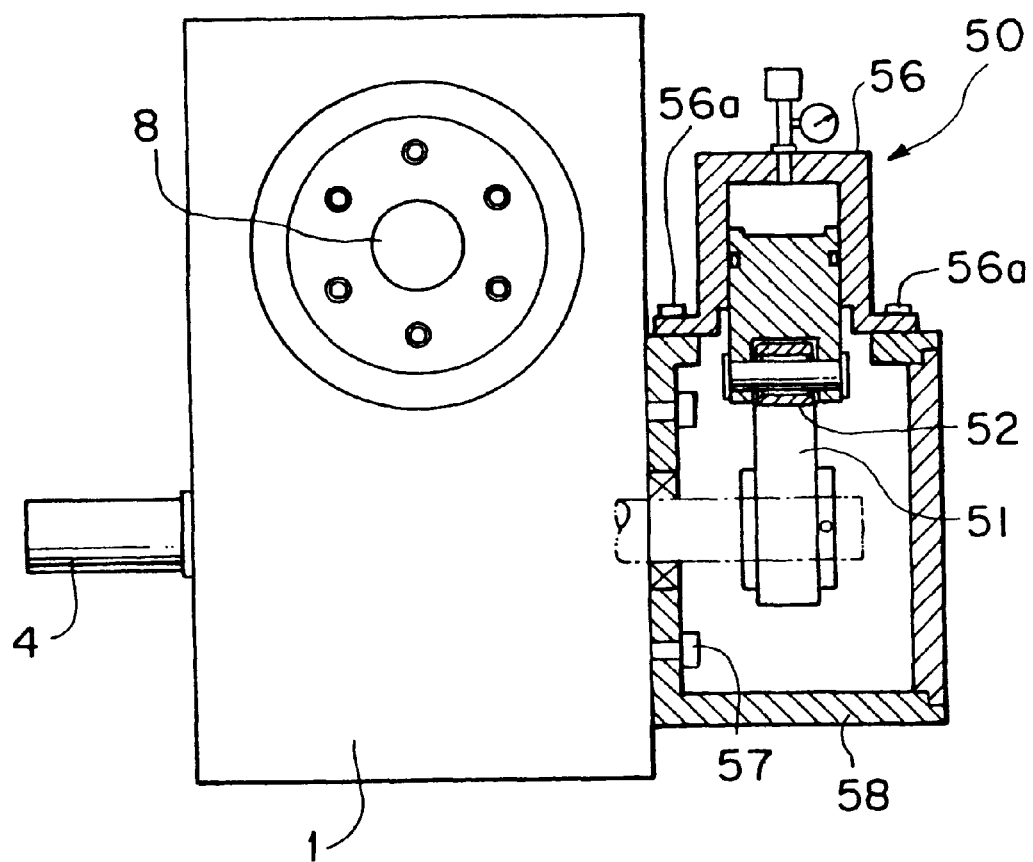
FIG. 11 is a partly cross-sectional, front-elevational view showing a fifth embodiment of a motion conversion apparatus of the invention.

FIG. 11 is a partly cross-sectional, front-elevational view of a fifth embodiment of the invention. This fifth embodiment is analogous to the fourth embodiment of FIG. 10, and instead of the resilient force-producing device of the fourth embodiment employing the spring member, a resilient force-producing device, employing the air spring device of the second embodiment (FIG. 7), is used in this fifth embodiment.

More specifically, in this fifth embodiment, a torque compensation device 50 includes a housing 58 containing a cam follower 52 and a torque compensation cam 51, and this housing 58 is fixedly secured to a side surface of a motion conversion apparatus body 1 by bolts 57. A cylinder 56, constituting a housing for the resilient force-producing device of the torque compensation device 50, is integrally fixed to the housing 58 by bolts 56a.

The fourth and fifth embodiments are provided with the above housing structure, and therefore there are achieved advantages that the elements within the torque compensation device 40, 50 are protected from the exterior, and that a lubricant such as grease can be retained within the housing.

Figure 12:
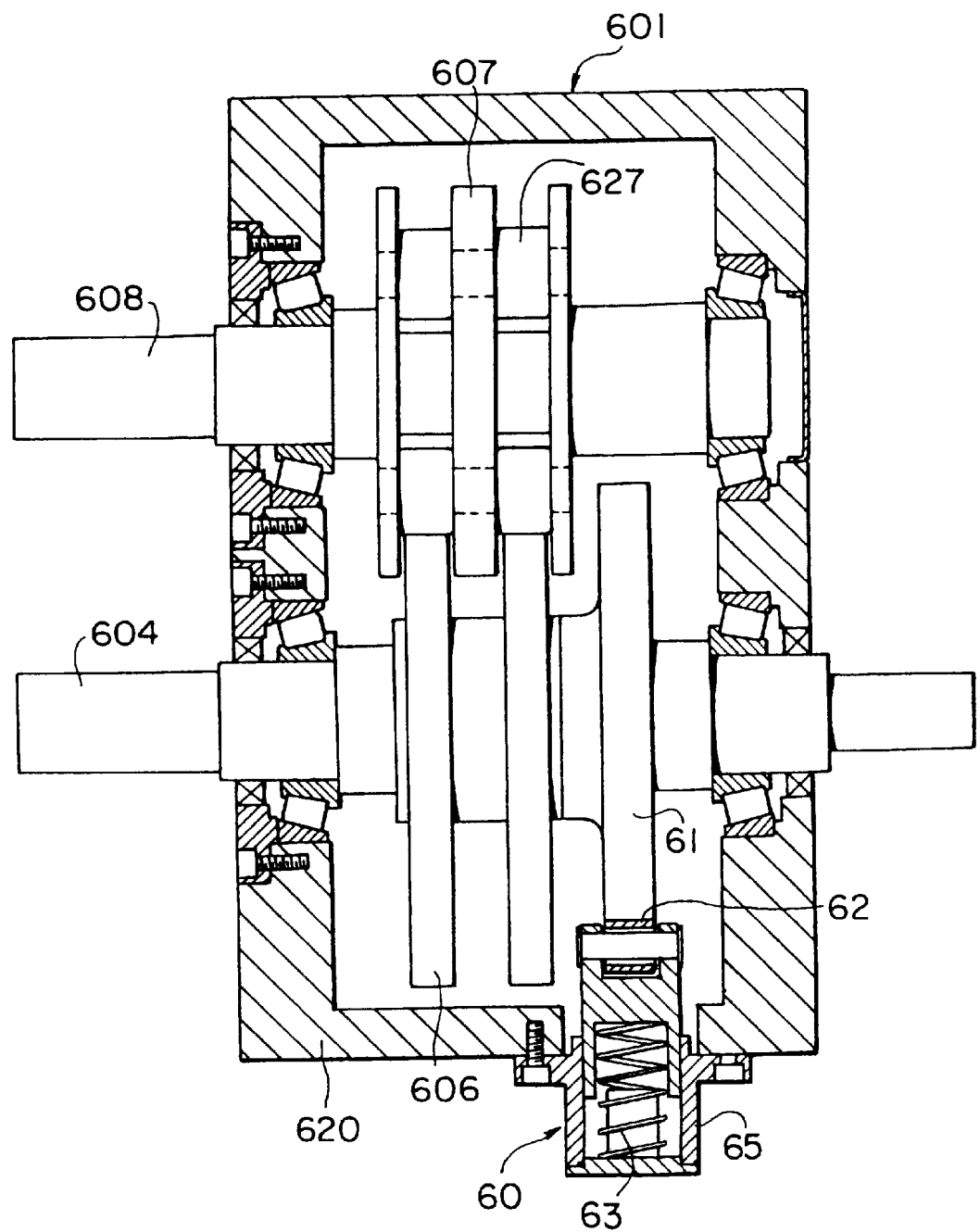
FIG. 12 is a cross-sectional view showing a sixth embodiment of a motion conversion apparatus of the invention.

FIG. 12 is a cross-sectional view of a motion conversion apparatus of a sixth embodiment of the invention, in which a torque compensation device 60 similar to that of the first embodiment of FIG. 6 is incorporated in a motion conversion apparatus body 601.

In this sixth embodiment, a torque compensation cam 61 of the torque compensation device 60 is mounted on that portion of an input shaft 604 received in a housing 620 of the motion conversion apparatus body 601. Part of a unit, comprising a resilient force-producing device of the torque compensation device 60 and a cam follower 62, is received in the housing 620 such that the cam follower 62 is engaged with the torque compensation cam 61. This unit is integrally fixed to the housing 620 of the motion conversion apparatus body 601 by bolts securing a flange of a slide guide 65 to the housing 620. The resilient force-producing device is similar to that of the first embodiment of FIG. 6, and has a spring member 63. In FIG. 12, reference numerals 606, 607, 608 and 627 denote an index cam, a turret, an output shaft and a cam follower, respectively.

Figure 13:
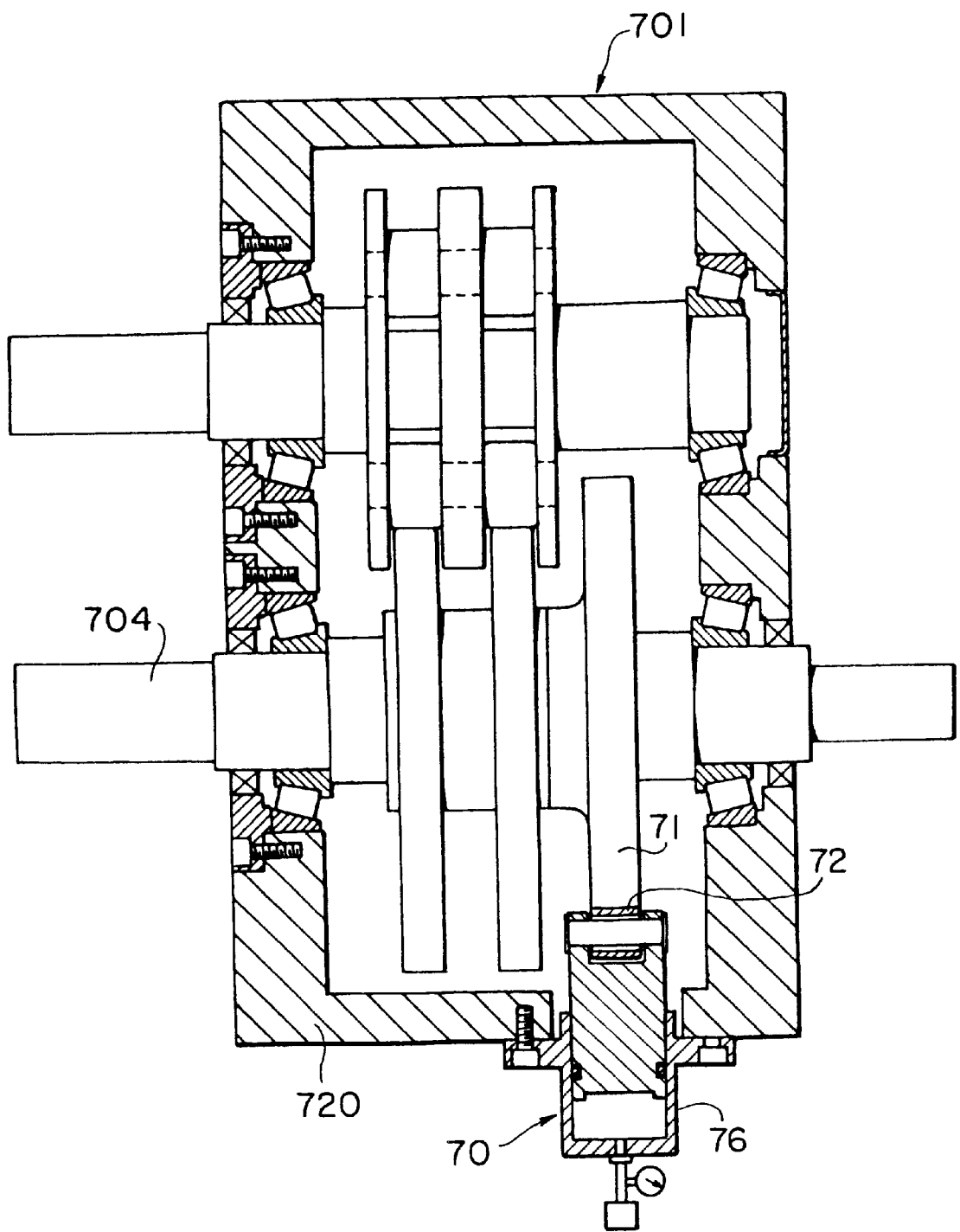
FIG. 13 is a cross-sectional view showing a seventh embodiment of a motion conversion apparatus of the invention.

FIG. 13 is a cross-sectional view of a seventh embodiment of the invention. This seventh embodiment is analogous to the sixth embodiment of FIG. 12, and instead of the resilient force-producing device of the sixth embodiment employing the spring member, a resilient force-producing device, employing the air spring device of the second embodiment (FIG. 7), is used in this seventh embodiment.

More specifically, a torque compensation cam 71 of a torque compensation device 70 is mounted on that portion of an input shaft 704 received in a housing 720 of a motion conversion apparatus body 701. Part of a unit, comprising the resilient force-producing device of the torque compensation device 70 and a cam follower 72, is received in the housing 720 such that the cam follower 72 is engaged with the torque compensation cam 71. This unit is integrally fixed to the housing 720 of the motion conversion apparatus body 701 by bolts securing a flange of a cylinder 76 (constituting a housing for the resilient force-producing device) to the housing 720.

Figure 14:
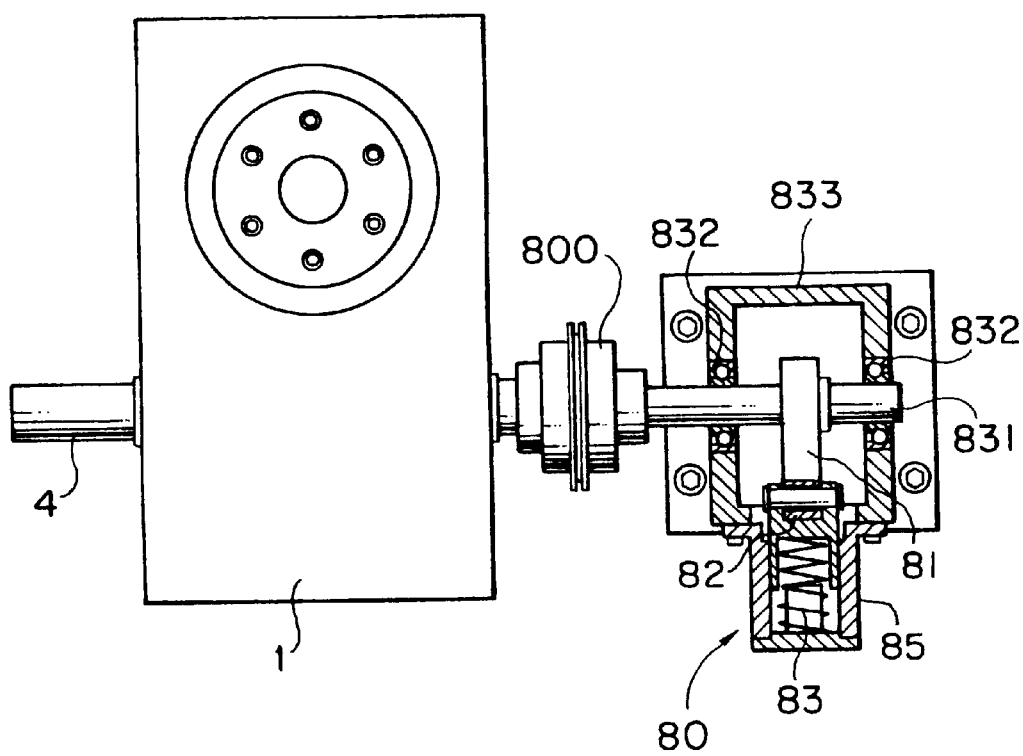
FIG. 14 is a partly cross-sectional, front-elevational view showing an eighth embodiment of a motion conversion apparatus of the invention.

FIG. 14 is a partly cross-sectional, front-elevational view of an eighth embodiment of the invention. In this eighth embodiment, a torque compensation device 80 has a rotation shaft 831 supported on a housing 833 through bearings 832. A torque compensation cam 81 is mounted on the rotation shaft 831, and is contained in the housing 833. The rotation shaft 831 is connected through a coupling 800 to an input shaft 4 extending from a motion conversion apparatus body 1. A resilient force-producing device of the torque compensation device 80 is similar to that of the first embodiment of FIG. 6, and employs a spring member 83, and a housing of this resilient force-producing device, that is, a slide guide 85, is integrally fixed to the housing 833 by bolts, and a cam follower 82 is engaged with the torque compensation cam 81.

Figure 15:
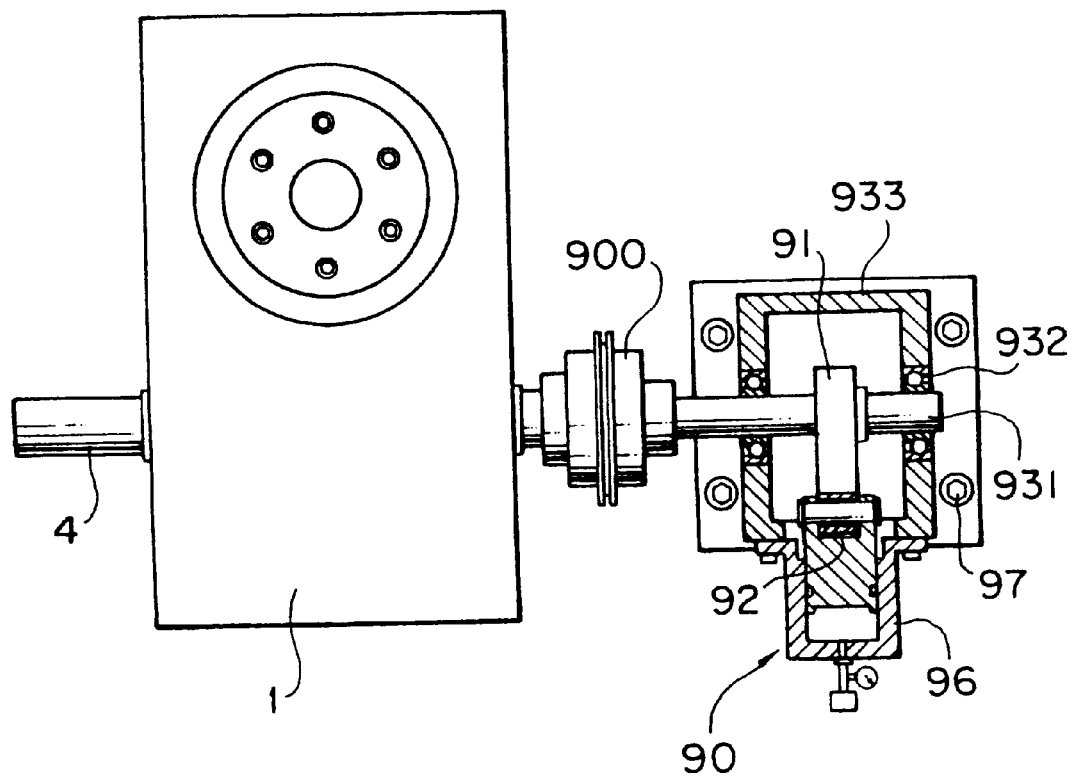
FIG. 15 is a partly cross-sectional, front-elevational view showing a ninth embodiment of a motion conversion apparatus of the invention.

FIG. 15 is a partly cross-sectional, front-elevational view of a ninth embodiment of the invention. This ninth embodiment is analogous to the eighth embodiment, and instead of the resilient force-producing device of the eighth embodiment employing the spring member, a resilient force-producing device, employing the air spring device of the second embodiment (FIG. 7), is used in this ninth embodiment.

More specifically, in this ninth embodiment, a torque compensation device 90 has a rotation shaft 931 supported on a housing 933 through bearings 932. A torque compensation cam 91 is mounted on the rotation shaft 931, and is contained in the housing 933. The rotation shaft 931 is connected through a coupling 900 to an input shaft 4 extending from a motion conversion apparatus body 1. A housing of the resilient force-producing device, that is, a cylinder 96, is integrally fixed to the housing 933 by bolts, and a cam follower 22 is engaged with the torque compensation cam 91.

In the eighth and ninth embodiments, the torque compensation device can be produced as a unit separate from the motion conversion apparatus body 1, and can be connected to the input shaft 4 extending from the motion conversion apparatus body 1.

Figure 16:
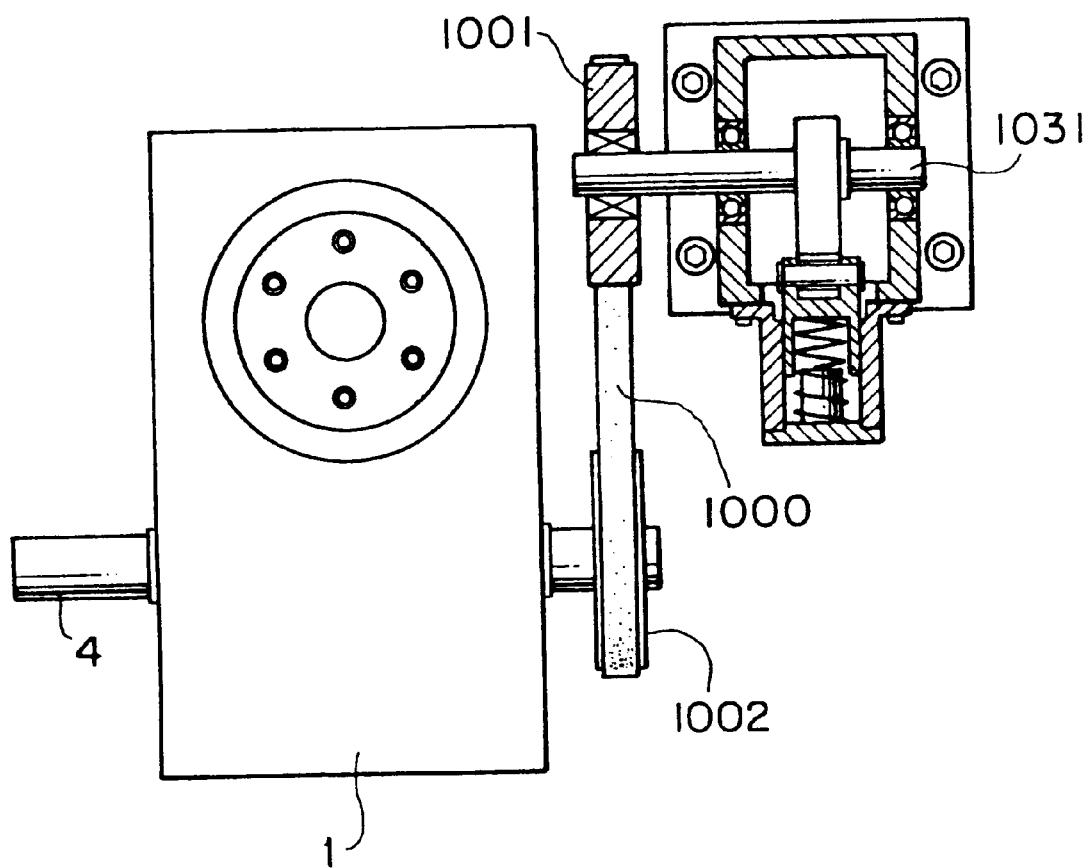
FIG. 16 is a partly cross-sectional, front-elevational view showing a tenth embodiment of a motion conversion apparatus of the invention.
Figure 17:
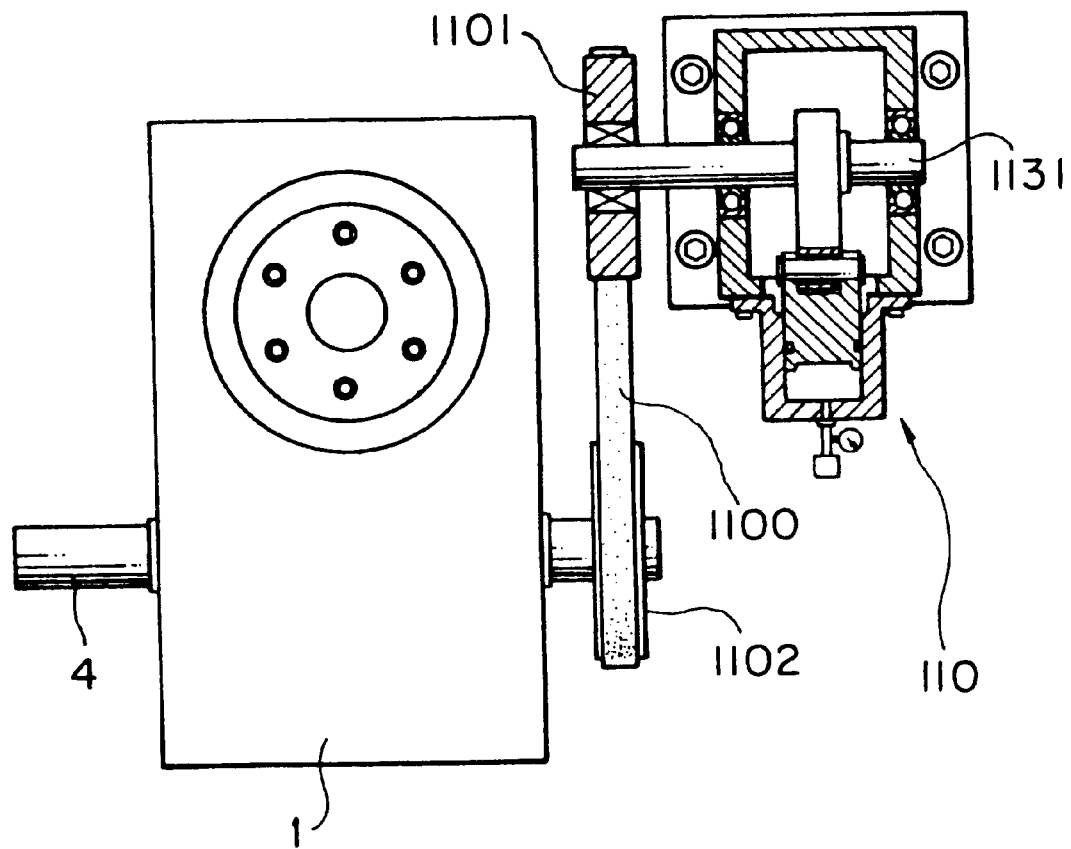
FIG. 17 is a partly cross-sectional, front-elevational view showing an eleventh embodiment of a motion conversion apparatus of the invention.

FIGS. 16 and 17 are partly cross-sectional, front-elevational views of tenth and eleventh embodiments of the invention, respectively. The tenth and eleventh embodiments differ respectively from the eighth and ninth embodiments of FIGS. 14 and 15 in that the connection between the shafts by the coupling 800, 900 is replaced by a shaft connection using a belt and pulleys.

More specifically, in the tenth embodiment of FIG. 16, an input shaft 4, extending from a motion conversion apparatus 1, is connected to a rotation shaft 1031 of a torque compensation device by the belt 1000 and the pulleys 1001 and 1002. in the eleventh embodiment of FIG. 17, an input shaft 4, extending from a motion conversion apparatus 1, is connected to a rotation shaft 1131 of a torque compensation device by the belt 1100 and the pulleys 1101 and 1102.

What is claimed is:

1. A motion conversion apparatus for converting a continuous rotational motion of an input shaft into a predetermined motion of an output shaft through a transmission cam device, said motion conversion apparatus is an intermittent drive apparatus for converting the continuous rotational motion of the input shaft into an intermittent rotational motion of the output shaft, said motion conversion apparatus comprising:

a torque compensation device comprising a cam connected to the input shaft, a cam follower, and a resilient force-producing device pressing said cam follower against said cam;

said torque compensation device being operable for applying a fluctuating cancellation torque to the input shaft for canceling;

(a) a frictional fluctuation torque portion, obtained by subtracting, from a frictional fluctuation torque acting on the input shaft due to a frictional load acting on at least one of the input shaft and the output shaft when converting the motion of the input shaft into the motion of the output shaft through the transmission cam device, an average value or an approximate average value of said frictional fluctuation torque, and (b) an inertial fluctuation torque acting on the input shaft due to an inertia load when converting the motion of the input shaft into the motion of the output shaft, said torque compensation device applies the fluctuating cancellation torque, substantially of a magnitude as defined by the following formulas, to the input shaft:

$$M_{ic} + M_i - (g_1 + g_2) = 0 \qquad \text{Formula 1}$$

$$g_1 = \frac{1}{t_e}\int_0^\pi M_{fo}\frac{\dot{t}}{\dot{\theta}}dt \qquad \text{Formula 2}$$

$$g_2 = \frac{1}{t_c}\int_0^\pi M_f dt \qquad \text{Formula 3}$$

where $M_{fo}$ represents a frictional torque of the output shaft, $M_f$ represents a frictional torque of the input shaft, $g_1$ represents an average value of the frictional torque acting on the input shaft, $g_2$ represents an average value of the frictional torque acting on the output shaft, tc represents a time elapsed from a start of operation of the transmission cam device, $\theta$ represents an angle of rotation of the input shaft, $\tau$ represents an angle of rotation of the output shaft, $M_i$ represents a sum of the frictional fluctuation torque acting on the input shaft and the inertial fluctuation torque acting on the input shaft by operation of the transmission cam device, and $M_{ic}$ represents the fluctuating cancellation torque exerted on the input shaft by operation of said torque compensation device.

2. Apparatus according to claim 1, in which said resilient force-producing device comprises an air spring device for producing a resilient force by expanding and contracting the air.

3. Apparatus according to claim 2, in which said resilient force-producing device has a device for adjusting an initial spring force of said air spring device.

4. Apparatus according to claim 3 in which said torque compensation device includes a housing containing said cam, said cam follower, and said resilient force-producing device.

5. Apparatus according to claim 2 in which said torque compensation device includes a housing containing said cam, said cam follower, and said resilient force-producing device.

6. Apparatus according to claim 1 in which said resilient force-producing device includes a compression spring of a mechanical element.

7. Apparatus according to claim 6, in which said resilient force-producing device has a device for adjusting an initial compression force of said compression spring.

8. Apparatus according to claim 7 in which said torque compensation device includes a housing containing said cam, said cam follower, and said resilient force-producing device.

9. Apparatus according to claim 6 in which said torque compensation device includes a housing containing said cam, said cam follower, and said resilient force-producing device.

10. Apparatus according to claim 1 in which said torque compensation device includes a housing containing said cam, said cam follower, and said resilient force-producing device.

* * * * *

UNITED STATES PATENT AND TRADEMARK OFFICE
CERTIFICATE OF CORRECTION

PATENT NO. : 6,009,773
DATED : January 4, 2000
INVENTOR(S) : Heizaburo Kato et al It is certified that error appears in the above-identified patent and that said Letters Patent is hereby corrected as shown below:

Col. 5, line 61, after "body" insert --10--.

Col. 6, line 16, delete "$M_{fc}$" and substitute therefor --$M_{fo}$--.

Col. 10, line 53, after "guide" insert --15--.

Col. 11, line 25, after "device" insert --20--.

Col. 11, line 31, after "member" insert --25--.

Signed and Sealed this

Twelfth Day of December, 2000

Attest:

Attesting Officer

Q. TODD DICKINSON

Director of Patents and Trademarks